United States Patent
Ahn

(10) Patent No.: US 7,280,511 B2
(45) Date of Patent: Oct. 9, 2007

(54) METHOD FOR DETERMINING REVERSE RATE IN MOBILE COMMUNICATION SYSTEM AND APPARATUS THEREOF

(75) Inventor: Chang Bo Ahn, Seoul (KR)

(73) Assignee: LG-Nortel Co., Ltd., Seoul (KR)

( * ) Notice: Subject to any disclaimer, the term of this patent is extended or adjusted under 35 U.S.C. 154(b) by 1155 days.

(21) Appl. No.: 10/190,514

(22) Filed: Jul. 9, 2002

(65) Prior Publication Data

US 2003/0060203 A1 Mar. 27, 2003

(30) Foreign Application Priority Data

Sep. 26, 2001 (KR) ................ 2001-59509

(51) Int. Cl.
*H04B 7/204* (2006.01)
*H04J 3/16* (2006.01)
(52) U.S. Cl. ...................... 370/335; 370/465
(58) Field of Classification Search ............. None
See application file for complete search history.

(56) References Cited

U.S. PATENT DOCUMENTS 6,069,883 A * 5/2000 Ejzak et al. ............. 370/335
6,490,268 B1 * 12/2002 Lee et al. ................ 370/342
6,741,862 B2 * 5/2004 Chung et al. ........... 455/452.1
6,760,567 B1 * 7/2004 Jeong et al. ............ 455/67.11
6,807,162 B2 * 10/2004 Hayashi et al. ......... 370/335
6,996,415 B2 * 2/2006 Lee et al. ................ 455/522
6,999,425 B2 * 2/2006 Cheng et al. ............ 370/252
7,054,275 B2 * 5/2006 Kim et al. ............... 370/252

FOREIGN PATENT DOCUMENTS

KR  10-2002-0006588  1/2002

* cited by examiner

*Primary Examiner*—Andrew C. Lee
(74) *Attorney, Agent, or Firm*—KED & Associates, LLP

(57) ABSTRACT

An apparatus and method are disclosed for determining different reverse rates, in accordance with a reverse data transmission state of each mobile station, at a base station having a 1×EV-DO system. The present invention improves the processing capacity of a reverse link by generating a weight based on a comparison result of a present data amount and a previous data amount of each mobile station, calculating a new reverse rate limit by imposing the generated weight onto a predetermined reverse rate limit, and transmitting the newly calculated reverse rate limit to every mobile station within a reverse rate limit message.

39 Claims, 4 Drawing Sheets

| No. of Active Calls | RateLimit |
|---|---|
| 1 | 153.6Kbps |
| 2 | 76.8Kbps |
| 3 | 76.8Kbps |
| 4 | 38.4Kbps |
| 5 | 38.4Kbps |
| 6 | 19.2Kbps |
| 7 | 9.6Kbps |
| 8 | 9.6Kbps |

| Index | Previous data | Present data |
|---|---|---|
| 0 | 1,024(4) | 768(3) |
| 1 | 0 | 1,024(4) |
| 2 | 512(2) | 0 |
| 3 | 1,024(4) | 1,536(6) |
| . | . | . |
| . | . | . |
| . | . | . |

\* No. of packet data is shown in parentheses

METHOD FOR DETERMINING REVERSE RATE IN MOBILE COMMUNICATION SYSTEM AND APPARATUS THEREOF

BACKGROUND OF THE INVENTION

1. Field of the Invention

The present invention relates to a base station apparatus in a 1×EV-DO system and a method thereof that determine different reverse rates for different data transmission situations of each mobile station.

2. Background of the Related Art

In general, an IS-95 based mobile communication system provides voice-centered services. Recently, however, thanks to the development of 1×EV-DO wireless protocol, which is a forward link providing the maximum 2.4576 Mbps high speed packet data service, the mobile communication system is now able to provide multimedia services, such as IMT-2000 service as well as high speed packet data service, moving image service, and further packetized voice service.

The 1×EV-DO system is not focused on providing voice-centered services like IS-95. Rather, it is aiming to provide high speed packet data services only. Specifically, the data source of each mobile station varies depending on the wireless environment. The high speed data in a forward link is first loaded into a time slot that is segmented into 1.67 ms units and is transmitted through time division communication.

The reverse rates in the 1×EV-DO system are 9.6 Kbps, 19.2 Kbps, 38.4 Kbps, 76.8 Kbps, and 153.6 Kbps. The mobile station often changes the reverse rate to determine an appropriate rate in accordance with a reverse activity bit and a random number. The random number is based on a reverse rate limit that is included in a broadcast reverse rate limit message and transmitted from the base station. The reverse rate limit is pre-defined in a manner that it is designated according to an active call.

Related art reverse rate limits of the mobile stations are designated according to the number of mobile stations supporting active calls, in a sector where the reverse rate limit message is broadcasted. In other words, if the number of active calls in a sector is low, the base station employing a related art 1×EV-DO system, to maximize reverse link throughput, selects a high reverse rate limit. On the other hand, if the number of active calls in a sector is high, the reverse rate limit is set low to reduce the reverse link loading.

FIG. 1 is a block diagram illustrating an apparatus for determining the reverse rate in a related art mobile communication. The device includes a plurality of mobile stations 11 and a base station 12 that generates and transmits a broadcast reverse rate limit message. Base station 12 has a reverse rate generation module 12a that generates a broadcast reverse rate limit message by selecting a reverse rate limit per active mobile station using a mapping table (refer to FIG. 2). The mapping table associates reverse rate limits with the numbers of active calls. After a reverse rate limit is selected, reverse rate generation module transmits the broadcast reverse rate limit message to every active mobile station. All mobile stations in the active state receive the same reverse rate limit. Reverse rate generation module 12a calculates the number of active calls for each mobile station that transmits reverse data. Then, using the mapping table, reverse rate generation module 12a sets the reverse rate limit, corresponding to the calculated number of active calls, and assigns this limit to each mobile station. For instance, suppose the present number of active calls in the sector is 5. Then, based on the associated limit in the mapping table, reverse rate generation module 12a designates 38.4 Kbps as the reverse rate limit for each of the five mobile stations. Therefore, the broadcast reverse rate limit message including the reverse rate limit, 38.4 Kbps, is transmitted to the five active mobile stations.

FIG. 2 illustrates a mapping table associating the reverse rates with the number of the active calls in the related art mobile communication system. The number of active calls in the mapping table ranges from 1 to 8, and a reverse transmit limit is associated with each number of active calls. For example, if the number of active calls is 1, the reverse rate limit is 153.6 Kbps, which is the maximum value applicable to the 1×EV-DO system. As the number of active calls increases, the reverse rate limit decreases. In this manner, the minimum reverse rate, 9.6 Kbps, is associated with 8 active calls. FIG. 2 is just one example of the mapping table. Thus, even when the number of active calls exceeds 5, it is possible to make a different mapping between the number of active calls and the reverse rate limit.

FIG. 3 is a flow chart showing a method for generating a broadcast reverse rate limit message in the related art. Base station 12 calculates the number of active calls based on the active calls requested from each mobile station 11. Then, base station 12 determines the reverse rate limit corresponding to the calculated number of active calls, using the mapping table (S31).

Afterwards, base station 12 determines whether an index, having values that identify each mobile station 11 uniquely and that have been assigned to each active state mobile station, is set to identify the maximum reverse power control (RPC) value (S33). Base station 12 repeatedly generates a reverse rate limit message for every index value, using the reverse rate limit determined in the step 31, until the index reaches the maximum RPC value (S35). Each index value is pre-assigned to a mobile station. Also, the maximum RPC can be designated as 32. Thus, it is possible to identify each mobile station based on the index value, and when the reverse rate limit message generated is transmitted to every mobile station later, the index can be used for transmitting the reverse rate limit message to each mobile station.

When the index value exceeds the maximum RPC, base station 12 transmits the reverse rate limit message generated for index values 0 through 31 to each mobile station (S37). The reverse rate limits included in the reverse rate limit messages, transmitted to all mobile stations, hold an equivalent value. Steps 31 through 37 can be repeated for every transmission cycle of the reverse rate limit.

The above-described method of applying the reverse rate limit, determined according to the number of active calls to all active state mobile stations, does not consider the transmission state of each mobile station. That is to say, although there may be a great number of active calls and some mobile stations may have large volumes of data to transmit, if a low reverse rate limit is applied to every mobile station equally, the mobile stations with large volumes of data to transmit will not be able to secure a transmission rate high enough to transmit all the data. This consequently lowers the usage efficiency of the reverse link greatly.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

It is, therefore, an object of the present invention to provide a method and apparatus for determining a different reverse rate for each active state mobile station.

To achieve the above objects, there is provided a method for determining a reverse rate in a mobile communication system, including calculating secondary reverse rate limits for at least one mobile station using weights generated in accordance with reverse data transmission states, taken in from at least one mobile station, and using a predetermined primary reverse rate limit; and transmitting at least one reverse rate limit message, which includes the secondary reverse rate limits for the at least one mobile station, to the at least one mobile station.

Preferably, the calculation of secondary reverse rate limits continues until an index assigned to a mobile station, transmitting the reverse data, becomes greater than a predetermined index.

Preferably, the secondary reverse rate limits for the at least one mobile station are calculated differently, depending on an outcome of the weights.

Preferably, the reverse data transmission state includes a previous reverse data amount and a present reverse data amount, and the previous reverse data amount and the present reverse data amount are compared with each other to generate a weight. Preferably, the weight is increased if the present reverse data amount is greater than the previous reverse data amount and the weight is decreased if the present reverse data amount is less than the previous reverse data amount.

Also, a weight is preferably generated by comparing the present reverse data amount with an average of reverse data amounts, which are transmitted from mobile stations in an active state at present. Preferably, the weight is increased if the average of the reverse data amounts, which are transmitted from mobile stations in an active state, is greater than the present reverse data amount, and the weight is decreased if the average of the reverse data amounts, which are transmitted from mobile stations in an active state, is less than the present reverse data amount.

The secondary reverse rate limit is preferably calculated by imposing the predetermined primary reverse rate limit on the weight.

In addition, the present invention provides a method for determining a reverse rate in a mobile communication system, the method including: (a) measuring a present reverse data amount based on reverse data of a mobile station; (b) comparing the present reverse data amount with a previous reverse data amount; (c) calculating a secondary reverse rate limit by imposing a weight, which is generated according to the comparison result, on a predetermined primary reverse rate limit; (d) including the secondary reverse rate limit with a reverse rate limit message; and (e) transmitting the reverse rate limit message.

Preferably, every time reverse data is received from the mobile station, steps (a) through (d) are repeatedly performed until an index assigned to the mobile station becomes greater than a predetermined index, thereby calculating a secondary reverse rate limit.

Additionally, the present invention provides an apparatus for determining a reverse rate in a mobile communication system, which includes a data measurement means for measuring a present reverse data amount, based on reverse data received from at least one mobile station; a weight generation means for generating a weight, by comparing the present reverse data amount with a previous reverse data amount; and a message generation means for calculating a new reverse rate limit, by imposing the generated weight on a predetermined reverse rate limit, and for including the new reverse late limit with a reverse rate limit message.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figures 4, 5:
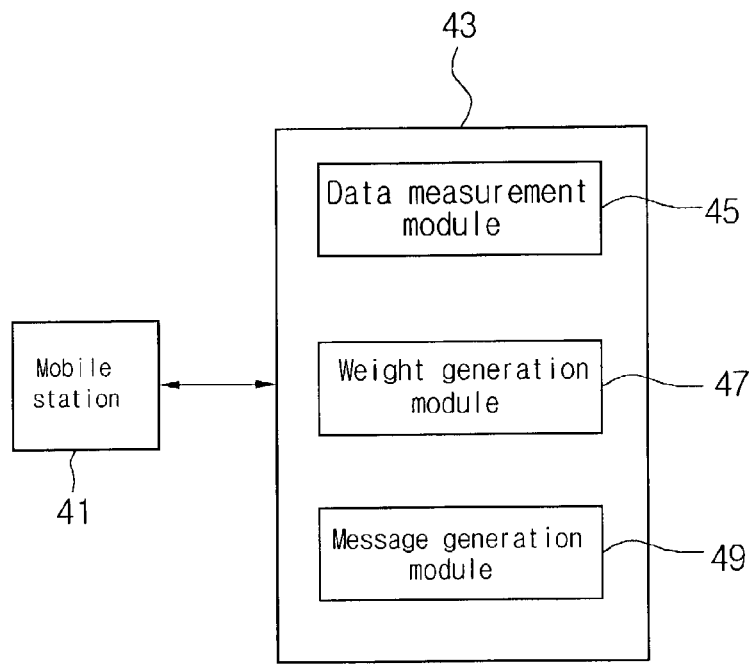
FIG. 4 illustrates an apparatus for selecting a reverse rate in a mobile communication system according to the present invention.
FIG. 5 illustrates a table storing a measured amount of reverse data corresponding to each index value, according to the present invention.

FIG. 4 is a block diagram illustrating an apparatus for settling a reverse rate in a mobile communication system, according to the present invention. The apparatus includes a plurality of mobile stations 41 and a base station 43 that generates a reverse rate limit message, including a reverse rate limit that is designated based on a weight. Base station 43 includes a data measurement module 45 that measures an amount of present reverse data, based on reverse data received from the plurality of mobile stations 41. A weight generation module 47 generates the weight by comparing the present reverse data amount with a previous reverse data amount. Message generation module 49 calculates a new reverse rate limit by imposing the generated weight on a pre-designated reverse rate limit and includes the new reverse rate limit in a reverse rate limit message.

Base station 43 calculates the number of active calls based on the reverse data received from mobile stations 41 and, using a mapping table, determines a reverse rate limit corresponding to the number of active calls. Therefore, it is possible to calculate a new reverse rate limit by imposing the reverse rate limit on a weight.

Data measurement module 45 measures a present reverse data amount, based on the reverse data received from mobile stations 41, and stores the present reverse data amount in a present data field 55 of a table, as shown in FIG. 5. Also, the previous reverse data amount, which was measured in a similar manner previously, is stored in a previous data field 53, beforehand. Preferably, the previous/present reverse data amount stored in the table identifies the number of packet data packets received. That is, the reverse data received from the mobile stations 41 may be formed of packet data units, and base station 43 may calculate the number of packet data units received from each mobile station 41 to store the number in the table. As a reverse rate transmission cycle restarts in base station 43, the present reverse data amount is stored in the previous data field 53 and a data amount that is calculated based on newly received reverse data is stored in the present data field 55.

Weight generation module 47 first compares the stored present reverse data amount with the stored previous reverse data amount, and based on the comparison result, module 47 generates a weight. More specifically, weight generation module 47 generates '+1' if the present reverse data amount is greater than the previous reverse data amount and '−1' if the present reverse data amount is smaller than the previous reverse data amount. Of course, if the comparison result indicates a big difference between the present reverse data amount and the previous reverse data amount, different weights, such as +2, +3, or −2, −3, can be generated as well.

Figures 1, 2:
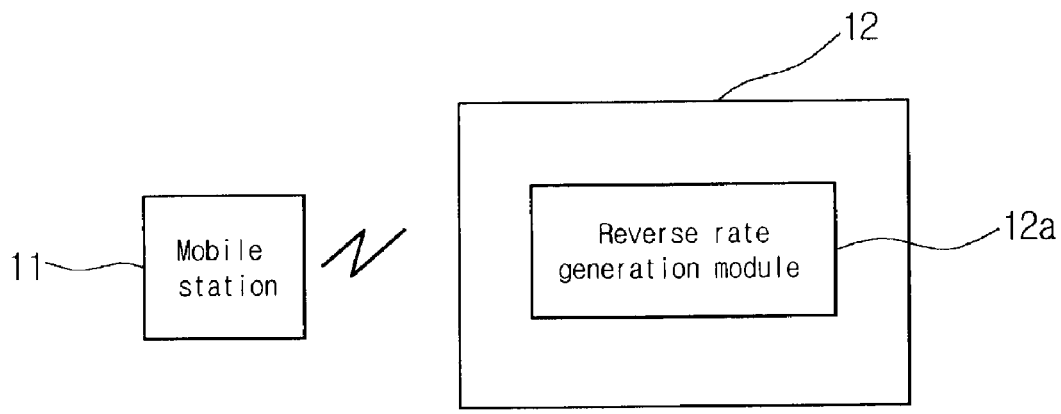
FIG. 1 illustrates a device for selecting a reverse rate in a mobile communication system of the related art.
FIG. 2 illustrates a mapping table associating a reverse rate limit with the number of active calls in a mobile communication system of the related art.

The weight '+1' or '−1' means that the currently designated reverse rate limit is respectively increased or decreased by a single step. For example, suppose that the present number of active calls is 6, as shown in FIG. 2, and the designated reverse rate limit corresponding to this number of the active calls is 19.2 Kbps. In such a case, if the weight generated by weight generation module 47 is '+1', the reverse rate limit becomes 38.4 Kbps, having been increased by one step because of the '+1' weight. Similarly, if the weight is '−1', the new reverse rate limit becomes 9.6 Kbps, having been decreased by one step. More details on this principle are provided below.

FIG. 5 illustrates a table storing a measured amount of reverse data corresponding to each index value, according to the present invention. With reference to FIG. 5, suppose that bit values of 1024, 0, 512, and 1024 are stored in the previous data field 53, and 768, 1024, 0, and 1536 are stored in the present data field 55 for index values 0, 1, 2, and 3, respectively. Weight generation module 47 first compares the reverse data amounts stored in the previous data field 53 with the reverse data amounts stored in the present data field 55 and, based on the comparison result, then generates a weight. For example, when the index value is 0, since the present reverse data amount of 768 bits is less than the previous reverse data amount of 1,024 bits, a '−1' weight is generated. Similarly, the method is applied to the other indexes, and it is found that '+1', '−1', and '+1' weights are generated for indexes values 1, 2, and 3, respectively. Accordingly, in the case where the number of active calls is 4 and the active mobile stations 41 are uniquely identified by index values 0, 1, 2, and 3, respectively, the new reverse rate limits based on the generated weights are 38.4 Kbps, 76.8 Kbps, 38.4 Kbps, and 76.8 Kbps, respectively, given that the previous reverse rate limits were 76.8 Kbps, 38.4 Kbps, 76.8 Kbps, and 38.4 Kbps, respectively, and that no other reverse rate limit exists between the 38.4 Kbps and 76.8 Kbps limits.

Referring to FIG. 4 again, message generation module 49 can include the newly calculated reverse rate limit, produced by weight generation module 47, in each reverse rate limit message. In addition, message generation module 49 can transmit each individual reverse rate limit message to its respective mobile station 41. In this way, the reverse rate limits included in the reverse rate limit messages transmitted to the mobile stations 41 are different from one another and each reverse rate limit is individually applied to its corresponding mobile station 41. In short, separately determining the reverse rate limit for each mobile station 41 based on its current communication requirements enables the base station to more efficiently manage communication with the mobile stations.

Figure 3:
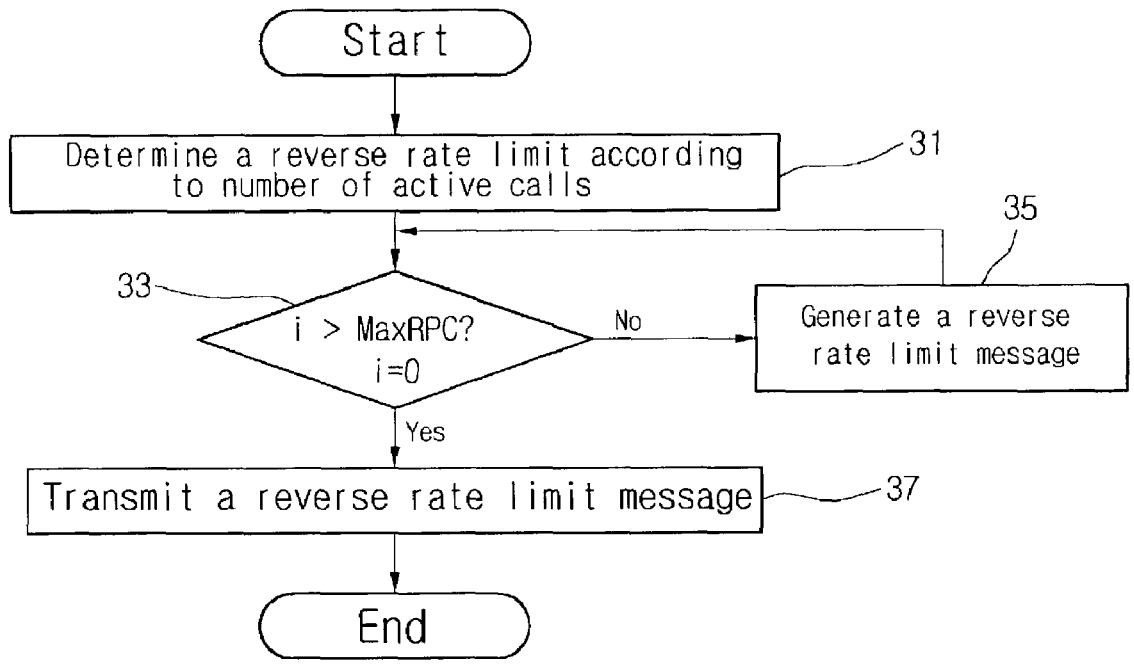
FIG. 3 illustrates a flow chart of a method for generating a broadcast reverse rate limit message in the related art.
Figure 6:
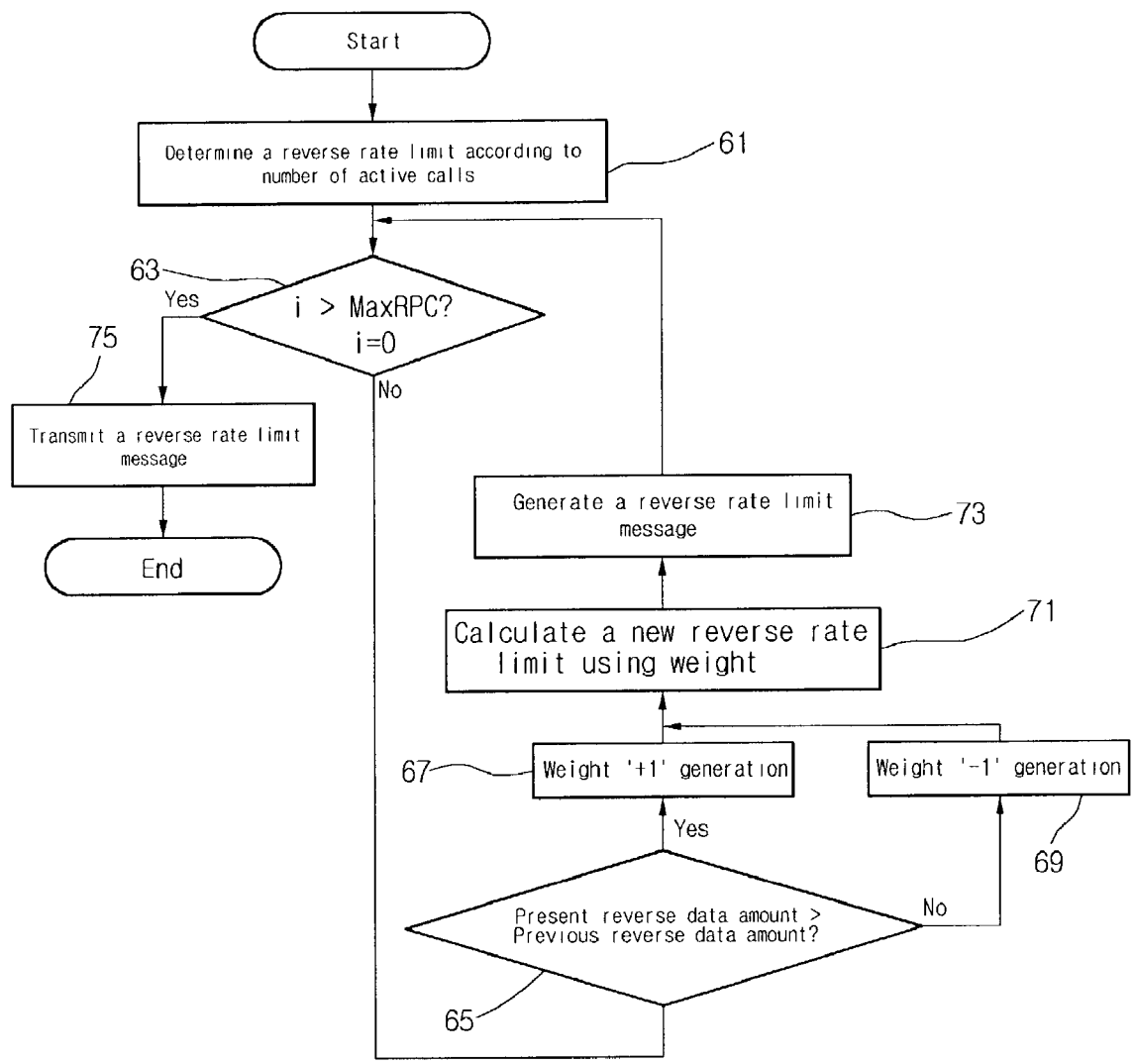
FIG. 6 illustrates a method for generating a broadcast reverse rate limit message, according to the present invention.

FIG. 6 is a flow chart illustrating the method for generating broadcast reverse rate limit messages according to the present invention. Note that steps 61, 63 and 75 are not explained here, since they are identical to those described previously in reference to FIG. 3. Referring now to FIG. 6, the number of active calls is calculated based on the number of active calls requested from each mobile station in the active state. Based on the calculated number of active calls, the corresponding reverse rate limit is determined using the mapping table (S61).

Next, it is decided whether the index is set to indicate the maximum reverse power control (RPC) value (S63). If not, the present reverse data amount and the previous reverse data amount, corresponding to the current index value, are read from the table to determine whether the present reverse data amount is greater than the previous reverse data amount (S65). If the comparison result indicates that the present reverse data amount is greater than the previous reverse data amount, the weight '+1' is generated (S67). On the other hand, if the present reverse data amount is less than the previous reverse data amount, the weight '−1' is generated (S69).

Thereafter, a new reverse rate limit is calculated using the weights generated either in step 67 or step 69 (S71). The new reverse rate limit is calculated by imposing the weights generated from steps 67 and 69 upon the previous reverse rate limit.

As explained before, the new reverse rate limit can be either increased or decreased depending on the weights generated in steps 67 and 69. And, since the weights are generated by comparing the present reverse data amount and the previous reverse data amount, the determination of the new reverse rate limit is influenced by the comparison result. Accordingly, different reverse rate limits may be concurrently assigned to the mobile stations in accordance with the amount of reverse data communicated by the respective mobile stations. The new reverse rate limit calculated from step 73 is included with the corresponding message and a reverse rate limit message is generated therefrom (S73).

Steps 65 through 73 are repeated until the index indicates the maximum RPC value, and the reverse rate limit message is generated accordingly.

Particularly in step 63, if the index value is greater than the maximum RPC, the reverse rate limit messages that have been generated up to this point can be transmitted to each mobile station (S75). At this time, the index assigned to each mobile station can be used to identify the mobile station intended to receive the individual reverse rate limit messages.

Another preferred embodiment of the present invention is explained with reference to FIG. 5. For each index value, the average amount of present reverse data communicated by all active mobile stations 41 is compared with the amount of present reverse data communicated by the indexed mobile station and a weight is generated, based on the result of the comparison. Preferably, if the present reverse data amount exceeds the average amount, the weight '+1' is generated, and if the present reverse data amount is less than the average amount, the weight '−1' is generated.

For example, suppose an average value of 832 bits is obtained by averaging the present reverse data amounts communicated by the active mobile stations corresponding to the index values of 0, 1, 2, and 3. In such a case, since the present reverse data amount corresponding to the index value of 0 is 768 bits, which is less than the average value of 832 bits, the weight '−1' is generated. Applying the same method to the other index values 1, 2, and 3, the weights '+1', '−1', and '+1' are sequentially generated. Thus, such a method can be an alternative to step 65 in FIG. 6, though the remaining steps in FIG. 6 may be unchanged.

In conclusion, the method for settling different reverse rate limits for different mobile stations, according to the reverse data amount communicated by each mobile station, improves the processing efficiency of the reverse link.

Furthermore, the load of the base station can be considerably reduced by properly adjusting the reverse rate according to the number of active calls.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for determining a reverse rate in a mobile communication system, comprising:
   calculating a secondary reverse rate limit for each of at least one mobile stations using a weight generated in accordance with reverse data transmission states of the respective mobile station and a respective predetermined primary reverse rate limit, the calculating including adjusting the predetermined primary reverse rate limit of the respective mobile station based on the weight of the respective mobile station, the reverse data transmission states comprising a previous reverse data amount and a present reverse data amount for each of the at least one mobile stations; and
   transmitting to each of the at least one mobile stations a corresponding reverse rate limit message, which includes the secondary reverse rate limit calculated for the respective mobile station.

2. The method of claim 1, wherein the at least one reverse rate limit messages are transmitted when an index used to uniquely identify each of the at least one mobile stations indicates a value greater than a predetermined index value.

3. The method of claim 1, wherein the reverse data transmission states corresponding to the at least one mobile stations are received from the at least one mobile stations that are in an active state.

4. The method of claim 1, wherein the previous reverse data amount and the present reverse data amount of each respective mobile station are compared with each other to generate the weight of the respective mobile station.

5. The method of claim 4, wherein the weight of the respective mobile station is increased if the present reverse data amount is greater than the previous reverse data amount of the respective mobile station.

6. The method of claim 5, wherein the weight of the respective mobile station is decreased if the present reverse data amount is less than the previous reverse data amount of the respective mobile station.

7. The method of claim 1, wherein the weight of the respective mobile station is generated by comparing the present reverse data amount of the respective mobile station with an average of reverse data amounts transmitted from the at least one mobile stations in an active state at present.

8. The method of claim 7, wherein the weight of the respective mobile station is increased if the average of the reverse data amounts is greater than the present reverse data amount of the respective mobile station.

9. The method of claim 7, wherein the weight of the respective mobile station is decreased if the average of the reverse data amounts is less than the present reverse data amount of the respective mobile station.

10. A method for determining a reverse rate in a mobile communication system, comprising:
    (a) measuring a present reverse data amount based on reverse data of a mobile station;
    (b) comparing the present reverse data amount with a previous reverse data amount to produce a comparison result;
    (c) calculating a secondary reverse rate limit by using a weight, which is generated according to the comparison result, to adjust a predetermined primary reverse rate limit;
    (d) including the secondary reverse rate limit with a reverse rate limit message; and
    (e) transmitting the reverse rate limit message.

11. The method of claim 10, wherein (a) through (d) are performed for each of a plurality of mobile stations and the plurality of reverse rate limit messages are transmitted when an index used to uniquely identify each of the plurality of mobile stations indicates a value greater than a predetermined index.

12. The method of claim 11, wherein the secondary reverse rate limit corresponding to each of the plurality of mobile stations is calculated based on the weight generated for the respective mobile station.

13. The method of claim 10, wherein the previous reverse data amount is measured from reverse data previously communicated by the mobile station and is saved.

14. The method of claim 10, wherein the weight is increased if the present reverse data amount is greater than the previous reverse data amount.

15. The method of claim 10, wherein the weight is decreased if the present reverse data amount is less than the previous reverse data amount.

16. The method of claim 10, wherein the weight is generated by comparing the present reverse data amount with an average of present reverse data amounts received from a plurality of mobile stations.

17. The method of claim 16, wherein the weight is increased if the average of the present reverse data amounts is less than the present reverse data amount.

18. The method of claim 16, wherein the weight is decreased if the average of the present reverse data amounts is greater than the present reverse data amount.

19. An apparatus for determining a reverse rate in a mobile communication station, comprising:
    a data measurement module that measures a present reverse data amount based on reverse data received from each of the at least one mobile stations;
    a weight generation module that generates a weight for each mobile station by comparing the present reverse data amount of the respective mobile station with a previous reverse data amount of the respective mobile station; and
    a message generation module that calculates a new reverse rate limit for each mobile station by using the generated weight of the respective mobile station to adjust a predetermined reverse rate limit of the respective mobile station and includes the new reverse rate limit of the respective mobile station within a reverse rate limit message for the respective mobile station.

20. The apparatus of claim 19, wherein the data measurement module measures and stores an amount of reverse data previously received from each mobile station as the previous reverse data amount of the respective mobile station.

21. The apparatus of claim 19, wherein the respective weight generated for each of the at least one mobile stations is increased if the corresponding present reverse data amount is greater than the corresponding previous reverse data amount.

22. The apparatus of claim 19, wherein the respective weight generated for each of the at least one mobile stations is decreased if the corresponding present reverse data amount is less than the corresponding previous reverse data amount.

23. The apparatus of claim 19, wherein the weight of the respective mobile station is generated by comparing the present reverse data amount of the respective mobile station with an average of present reverse data amounts received from the at least one mobile stations.

24. The apparatus of claim 23, wherein the weight of the respective mobile station is increased if the average of the present reverse data amounts is less than the present reverse data amount of the respective mobile station.

25. The apparatus of claim 23, wherein weight of the respective mobile station is decreased if the average of the present reverse data amounts is greater than the present reverse data amount of the respective mobile station.

26. The apparatus of claim 19, wherein the message generation module transmits the at least one reverse rate limit messages.

27. A method for determining a communication rate, comprising:
 (a) determining a present communication amount of a subscriber unit;
 (b) comparing the present communication amount with a previous communication amount of the subscriber unit to produce a comparison result; and
 (c) determining a future communication rate limit by applying a weighting value, generated according to the comparison result, to a current communication rate limit.

28. The method of claim 27, wherein the present communication amount is the number of packet data units communicated by the subscriber unit in a prescribed period.

29. The method of claim 28, wherein the previous communication amount is the number of packet data units communicated by the subscriber unit in a previous prescribed period.

30. The method of claim 27, further comprising performing (a) through (c) for each of a plurality of subscriber units.

31. The method of claim 30, further comprising:
 (d) including the corresponding future communication rate limit for each of the plurality of subscriber units in a separate message; and
 (e) transmitting the respective messages to the plurality of subscriber units when an index used to uniquely identify each of the plurality of subscriber units indicates a prescribed value.

32. The method of claim 31, further comprising performing (a) through (e) for each of a plurality of communication periods.

33. The method of claim 27, wherein the weighting value indicates an increase if the comparison result exceeds a first prescribed threshold and the weighting value indicates a decrease if the comparison result is less than a second prescribed threshold.

34. The method of claim 33, wherein the future communication rate limit is increased when the weighting value indicates an increase and is decreased when the weighting value indicates a decrease.

35. A method for determining a communication rate, comprising:
 (a) determining a present communication amount for each of a plurality of subscriber units;
 (b) comparing the present communication amount for each one of the plurality of subscriber units with an average communication amount for the plurality of subscriber units to produce a corresponding comparison result for each subscriber unit; and
 (c) determining a future communication rate limit for each subscriber unit by applying a weighting value, generated according to the corresponding comparison result, to a current communication rate limit of the respective subscriber unit.

36. The method of claim 35, wherein the present communication amount for each subscriber unit is the number of packet data units communicated by the corresponding subscriber unit in a prescribed period.

37. The method of claim 36, wherein the previous communication amount for each subscriber unit is the number of packet data units communicated by the corresponding subscriber unit in a previous prescribed period.

38. The method of claim 35, wherein the weighting value for each subscriber unit indicates an increase if the corresponding comparison result exceeds a first prescribed threshold and the weighting value for each subscriber unit indicates a decrease if the corresponding comparison result is less than a second prescribed threshold.

39. The method of claim 38, wherein the future communication rate limit for each subscriber unit is increased when the corresponding weighting value indicates an increase and is decreased when the corresponding weighting value indicates a decrease.

* * * * *